(12) United States Patent
Chen et al.

(10) Patent No.: US 8,406,477 B2
(45) Date of Patent: Mar. 26, 2013

(54) SYSTEM AND METHOD FOR CONSTRUCTING A THREE DIMENSIONAL OPERATIONAL GRAPHIC FROM A TWO DIMENSIONAL BUILDING CONTROL SUBSYSTEM DRAWING

(75) Inventors: Henry Chen, Beijing (CN); Conrad Bruce Beaulieu, Duluth, MN (US); Liana Maria Kiff, Minneapolis, MN (US); Tom Plocher, Hugo, MN (US)

(73) Assignee: Honeywell International Inc., Morristown, NJ (US)

( * ) Notice: Subject to any disclaimer, the term of this patent is extended or adjusted under 35 U.S.C. 154(b) by 309 days.

(21) Appl. No.: 12/855,574

(22) Filed: Aug. 12, 2010

(65) Prior Publication Data

US 2012/0039503 A1  Feb. 16, 2012

(51) Int. Cl.
- *G06K 9/00* (2006.01)
- *G06K 9/36* (2006.01)
- *G06T 15/00* (2006.01)

(52) U.S. Cl. ......... 382/113; 382/154; 382/285; 345/419
(58) Field of Classification Search .................. 382/113, 382/154, 285; 345/419–427; 356/12–14; 348/42–60
See application file for complete search history.

(56) References Cited

U.S. PATENT DOCUMENTS

| | | | |
|---|---|---|---|
| 4,897,798 A | 1/1990 | Cler | |
| 5,395,042 A | 3/1995 | Riley et al. | |
| 5,841,112 A | 11/1998 | Brooks et al. | |
| 6,411,862 B1 * | 6/2002 | Hazama et al. | 700/182 |
| 6,721,769 B1 * | 4/2004 | Rappaport et al. | 707/737 |
| 7,050,936 B2 | 5/2006 | Levy et al. | |
| 7,249,030 B2 | 7/2007 | Sopko, III et al. | |
| 7,383,148 B2 * | 6/2008 | Ahmed | 702/127 |
| 7,424,666 B2 | 9/2008 | Chandwani et al. | |
| 7,512,450 B2 * | 3/2009 | Ahmed | 700/19 |
| 7,548,833 B2 * | 6/2009 | Ahmed | 702/188 |
| 2005/0252984 A1 * | 11/2005 | Ahmed | 236/51 |
| 2005/0275525 A1 * | 12/2005 | Ahmed | 340/524 |
| 2005/0278047 A1 * | 12/2005 | Ahmed | 700/97 |
| 2006/0106757 A1 * | 5/2006 | Sakai et al. | 707/2 |
| 2006/0277007 A1 * | 12/2006 | Wakelam et al. | 703/1 |
| 2007/0132756 A1 * | 6/2007 | Plocher et al. | 345/420 |
| 2007/0191988 A1 * | 8/2007 | Aronstam | 700/276 |
| 2007/0219645 A1 * | 9/2007 | Thomas et al. | 700/29 |
| 2008/0058970 A1 | 3/2008 | Perumalsamy et al. | |
| 2008/0062167 A1 * | 3/2008 | Boggs et al. | 345/419 |
| 2008/0082183 A1 | 4/2008 | Judge | |
| 2008/0309678 A1 * | 12/2008 | Reghetti et al. | 345/635 |
| 2010/0066559 A1 * | 3/2010 | Judelson | 340/825.49 |
| 2011/0176179 A1 * | 7/2011 | Judelson | 358/448 |
| 2012/0039503 A1 * | 2/2012 | Chen et al. | 382/100 |
| 2012/0101797 A1 * | 4/2012 | Rappaport et al. | 703/13 |

* cited by examiner

*Primary Examiner* — Aaron W Carter
(74) *Attorney, Agent, or Firm* — Schwegman, Lundberg & Woessner, P.A.

(57) ABSTRACT

A method includes receiving into a computer processor a building control subsystem design drawing, and identifying a plurality of objects in the building control subsystem design drawing by comparing the objects to a template of objects. The template of objects includes one or more of a representation of a shape, a color, and a texture. A physical relationship among the plurality of objects is determined, and a three dimensional representation of the plurality of objects is retrieved from a three dimensional device library. A three dimensional building control subsystem graphic is generated by mapping the three dimensional representation of the plurality of objects into a three dimensional user interface as a function of the physical relationship. The three dimensional user interface is animated and interactive to monitor and control a building subsystem.

20 Claims, 12 Drawing Sheets

SYSTEM AND METHOD FOR CONSTRUCTING A THREE DIMENSIONAL OPERATIONAL GRAPHIC FROM A TWO DIMENSIONAL BUILDING CONTROL SUBSYSTEM DRAWING

TECHNICAL FIELD

The present disclosure relates to building control subsystem design drawings, and in an embodiment, but not by way of limitation, to a system and method for constructing a three dimensional operational graphic from the design drawing.

BACKGROUND

In architectural, engineering, and construction (AEC) environments, computer aided design (CAD) application programs are widely used to design building control subsystems. These subsystems include mechanical, electrical, and plumbing subsystems such as heating, ventilation, and air conditioning (HVAC) systems, and access control, asset management, facility management, locomotion, and energy co-generation subsystems. These CAD programs generate building control subsystem design drawings. Additionally, building control subsystem graphics that correspond to such building control subsystem drawings are widely used by a Building Management System (BMS) for state browsing, device setting, and/or fault diagnosis. These building control subsystem graphics are manually drawn by a graphic designer. To create a building control subsystem graphic, the designer must first read and understand the building control subsystem design drawing, and then manually drag and drop the predefined images to form the building control subsystem graphic—that is, a three dimensional perspective display. It is a challenge to precisely size two dimensional image objects into a three dimensional frame, and it is difficult to define an animation to simulate the state of the building control subsystem. Also, the independence between the building control subsystem design drawing and building control subsystem graphic can result in a building control subsystem graphic that is not an accurate extrapolation from the building control subsystem design drawing in the context of the actual building's structure. The content of the changes to the two dimensional drawing are often not fully represented in the three dimensional graphic because of the manual effort involved.

DETAILED DESCRIPTION

Figure 1:
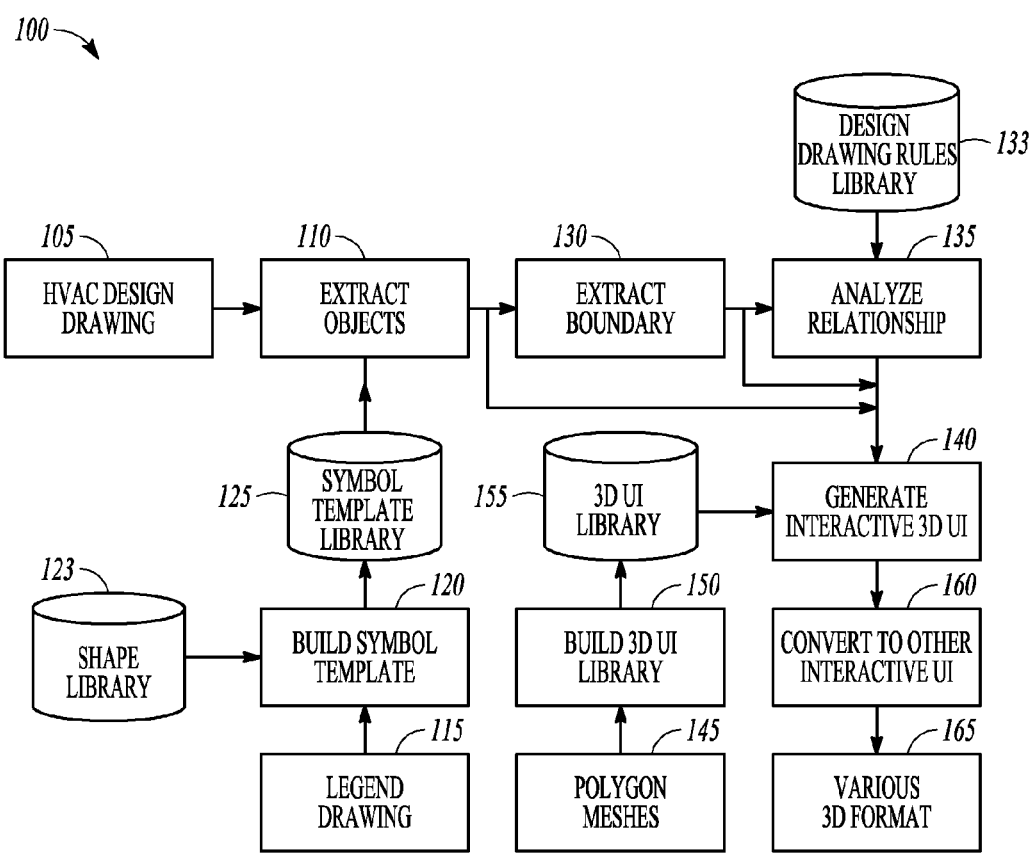
FIG. 1 is a block diagram of an example embodiment of a system to automatically generate a three dimensional operation system graphic from a building control subsystem design drawing.

To address one or more of the issues with three dimensional building operational graphics as indicated above, one or more embodiments disclosed herein relate to a method that automatically generates three dimensional building control subsystem graphics from corresponding building control design drawings. In an example embodiment disclosed herein, a heating, ventilation, and air conditioning system is discussed in detail.

In an embodiment, the system and method recognize an object in a building control subsystem design drawing. The object can be, for example, mechanical equipment, and appliance, or other equipment or structure. The object is recognized using a feature template, which is stored in a symbol template library, and which comprises representations of objects that can be found in building control subsystem design drawings. The features of an object that are stored in the symbol template library can include a representative shape, a color, and a texture. The attributes of objects in the building control subsystem design drawing are also extracted, identified via character recognition, and associated with the object.

After recognition of an object, the system and method extract one or more relationships among several objects using geometrical analysis or building control subsystem drawing rules. The geometrical features may include connections between the objects. In a building control subsystem such as an HVAC system, drawing rules may include rules like a field device should be along and below a duct boundary, a line between a point and a field device should be vertical to a duct direction, and a heating or cooling coil should have at least one valve and two pipes coupled to it.

After the extraction of the relationships among the objects, the system and method generate a three dimensional graphic of the building control subsystem design drawing via mapping an object into an interactive three dimensional user interface. Before this can be accomplished, a three dimensional device library for the building control subsystem domain device is built. A three dimensional polygon is imported into the system, and with this information, the objects can be sized in the HVAC graph and their orientation set in the library. Next, the three dimensional polygon is segmented into one or more widgets. As discussed below, a widget is an object on a building control subsystem design drawing that is defined by a name, a state variable, a behavior, and a three dimensional shape. The segmentation into widgets is discussed in more detail below. A variable that is associated with a building control subsystem device is set, and the behavior for each associated widget is determined (so that a state change of the device can be animated in the building control subsystem graph). For example, the system can be coupled to a control device for the physical device represented by the object on the building control subsystem design drawing, and animation can be displayed on the building control subsystem graphic. In an HVAC system, examples of such animation include the motion of a fan or the flow of a liquid through a pipe. Such animation can be synchronized with the actual speed of the fan or velocity of the liquid. The fluid or aerodynamics of the fluid in duct work or pipes could also be simulated, and a user could actually "see" the velocity or mass of a given flow. In another example, in the three dimensional device library, a three dimensional duct or pipe is generated according to the boundary of the object, and the object is then mapped into the three dimensional user interface according to the object's size and orientation. Text can be extracted from the building control subsystem design drawing, character recognized, and associated with the building control subsystem device represented by the intelligent object of the building control subsystem graphic.

After the animation and the binding of the widget, the three dimensional building control subsystem graph can be converted into various 3D or 4D formats, such as a web page with scripts, X3D/VRML, Silver light, and Adobe Flash. For a web page, the building control subsystem objects can be generated and laid out, and then exported as an HTML page. In an HVAC system, for the animation, a sequence of images for the widget of an HVAC device (fan, damper, cool coil, etc.) and a script to show the above sequence of images can be generated.

Figure 3:
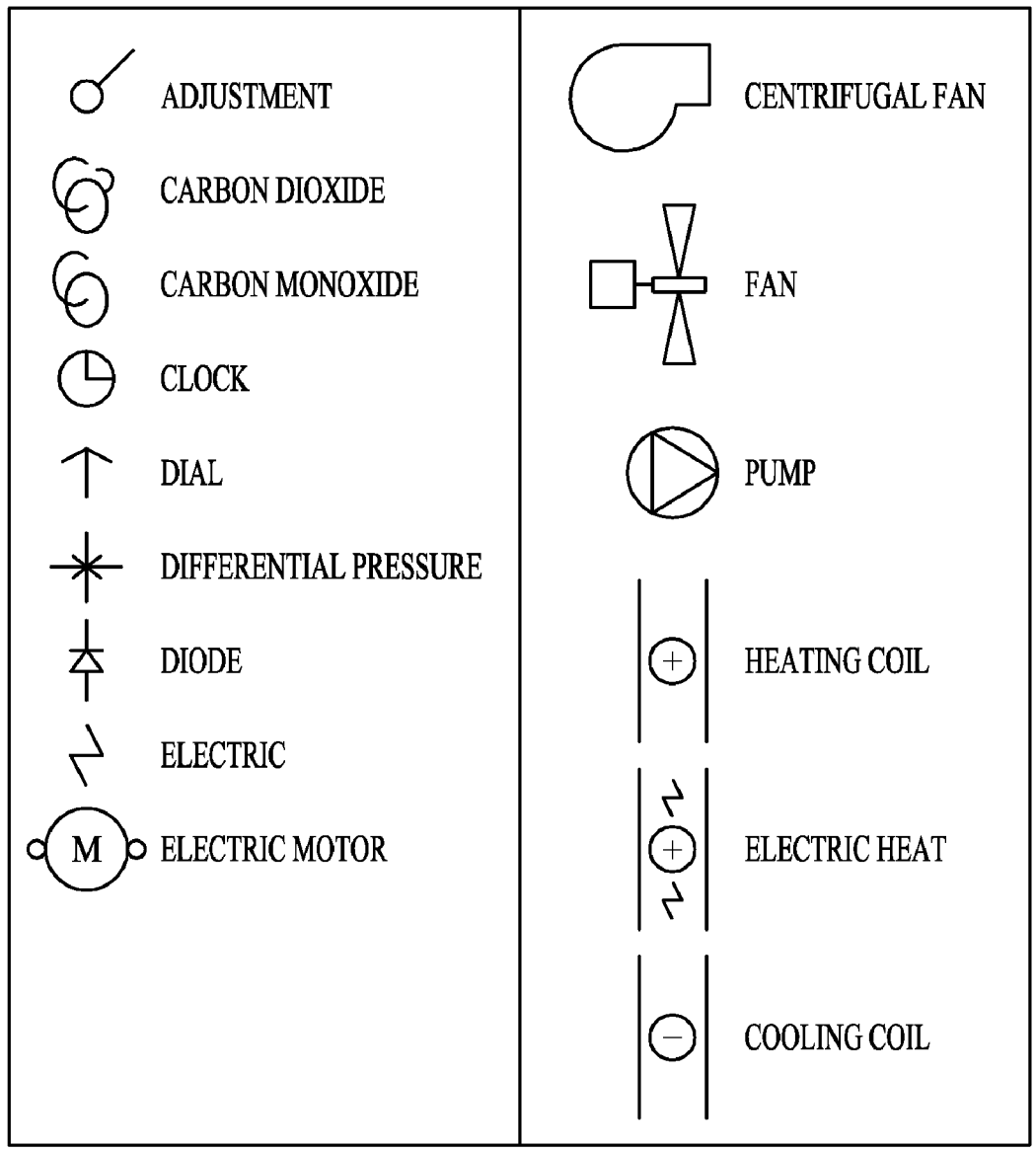
FIG. 3 illustrates an example of a legend drawing.

FIG. 1 illustrates in block diagram form an example system 100 to create HVAC control graphics from an HVAC design drawing. An HVAC design drawing is provided at block 105. At 110, objects are extracted from the HVAC design drawing. To accomplish this extraction, a symbol template 120 is built using a legend drawing 115 and a shape library 123, which includes all of the objects that are expected to be found on the HVAC drawing 105. An example of a legend drawing 115 can be seen in FIG. 3, which illustrates just a small sample of such object representations. In an HVAC design drawing, different kinds of objects are represented by the different symbols of FIG. 3. The symbol template 120 is stored in a symbol template library 125. A template for every expected symbol is constructed and saved in the library 125. The template can include many features for each object, such as a block, text, a line, or an arc. Character recognition in 110 can be used to interpret the text on the HVAC design drawing 105.

After the extraction of the objects at 110, each object is bounded at 130, and the relationships within each object are analyzed at 135 using a design drawing library 133. The boundary 130 and the analysis 135 is similar to a facial recognition scheme, wherein a person's face is first bounded, and then the features or points on the face are determined. The relationship analysis also determines the relationship among the several objects in the HVAC design drawing, which can be done using geometrical analysis and/or HVAC design drawing rules. In creating the boundary boxes, the system examines all structures on the HVAC design drawing by identifying similar angles and parallel lines that form a closed area. Then, an object with similar features is extracted from the template library 125. An example of a geometrical analysis is examining line connections between objects, and examples of HVAC design drawing rules include the rules that a field device should be below a duct boundary and a hot coil should have at least one valve and two pipes.

Figure 2A:
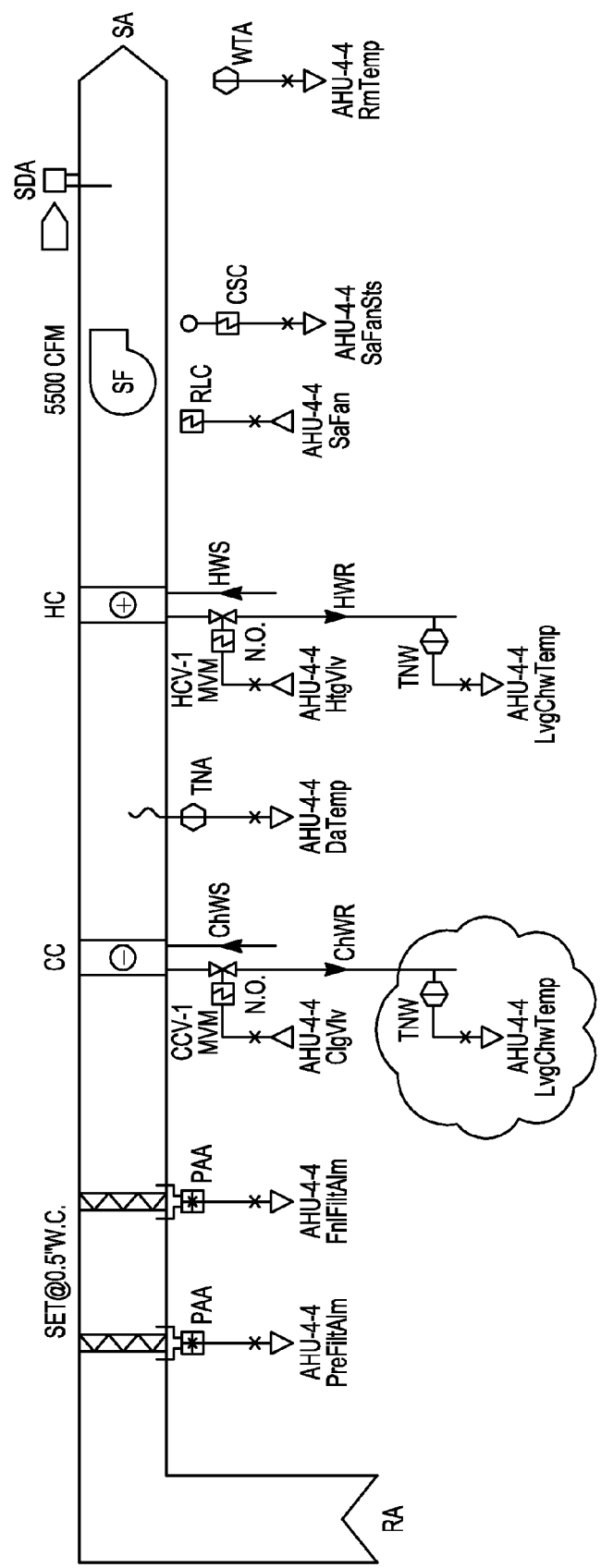
FIG. 2A is an example of an HVAC design drawing.
Figure 2B:
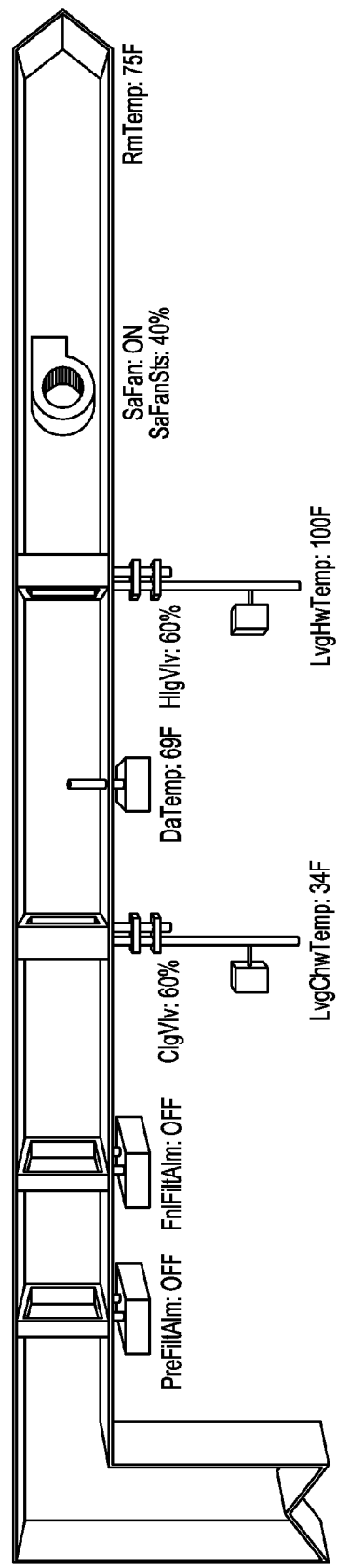
FIG. 2B is a three dimensional control system graphic generated from the HVAC design drawing of FIG. 2A.

An interactive three dimensional user interface is created at 140 by mapping objects into the three dimensional user interface. To create this mapped interactive three dimensional user interface at 140, polygon meshes 145 are used to build at 150 a library of three dimensional user interfaces 155. To build the three dimensional UI library, the three dimensional polygon objects are created in the HVAC domain. The three dimensional polygon is then imported, its bounding box calculated, its orientation set, and it is then segmented into widgets. The animation for each widget is then set by setting a variable that will be associated with the related subsystem control application, which in the example of an HVAC system is an HVAC device controller, and setting the variable so that state changes of the device controlled by the application can be animated in the HVAC graphic. That is, the variable can represent the state of a device, and this state can be animated in the HVAC graphic (e.g., a fast flow of liquid through a pipe). More specifically, a three dimensional polygon mesh is segmented into a plurality of widgets. A state variable is defined for each widget, and a three dimensional user interface is assembled from the widgets, the state variables, and the behaviors. The details of the widget creation are explained in further detail below. After the generation of the interactive three dimensional user interfaces at 140, the user interfaces 140 can be converted to other interactive user interfaces 160 in various three dimensional formats 165. These outputs can include a basic HTML webpage that generates the images as objects and further generates the layout of these images. Additionally, a script can be generated to show a sequence of images. Further outputs can include an X3D/VRML based interface, Silverlight, and Adobe Flash. The objects in the user interface 140 possess a degree of intelligence, as data regarding each object is associated with the object. An example of an HVAC design drawing is shown in FIG. 2A, and an example of a resulting HVAC graphic is shown in FIG. 2B.

The details of the use of polygon meshes 145 to build the three dimensional user interface library 150 are as follows. Specifically, the following discusses converting a 3D polygon mesh of a physical object into an interactive 3D UI so as to facilitate the development of the creation of a 3D HVAC graphic. A 3D polygon mesh is a 3D geometric model of a physical object that may be drawn by a graphics designer or captured by scanning a picture of the physical object. Such a 3D polygon mesh may represent an appliance in a physical environment such as, in the example of an HVAC system, an HVAC controller. The 3D polygon mesh may be segmented into interactive entities, also called widgets. The 3D UI permits a user to monitor and interact with one or more appliances in the physical environment via the 3D UI shown on a display device.

Figure 4:
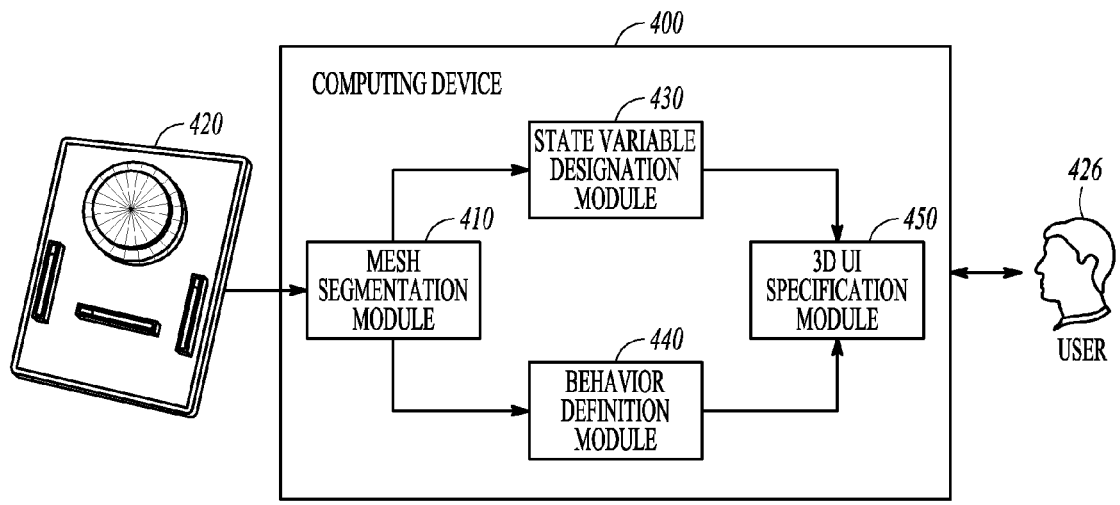
FIG. 4 is a block diagram of a system 400 for generating a 3D UI according to an example embodiment.

FIG. 4 is a block diagram of a system 400 for generating a 3D UI according to an example embodiment. The system 400 may be a computing device such as a processor or a microcontroller. The system 400 includes a mesh segmentation module 410 that is coupled to receive data representing a 3D polygon mesh 420 that is a static polygon mesh. The mesh segmentation module 410 segments the 3D polygon mesh 420 into a number of widgets, which can be transformed through rotation or translation or a combination of both or through any other type of transformation so that a user 426 can interact with the 3D polygon mesh 420. The system 400 includes a state variable designation module 430 to define a state variable for each widget. Each state variable has a type and a legal value range so that the user 426 can update, retrieve, and maintain the state of a widget via the 3D interactive user interface (140). The system 400 includes a behavior definition module 440 that defines a behavior for each widget. The behavior may be translation or rotation or another type of transformation, and has corresponding parameters that may include constraints. For example, the behavior may be moving along a specific line segment or rotating within some angle. The behavior defines how the user 426 may interact with each widget.

The system 400 includes a 3D UI specification module 450 that binds the state variable with the behavior in a relationship for each widget. The 3D UI specification module 450 assembles a specification for the 3D UI. The 3D UI specification encapsulates and stores the information about the widgets for the entire 3D polygon mesh, including the related state variables and behaviors, and the binding relationship between each state variable and its associated behavior. The 3D UI specification can be saved as a file and loaded into memory so that it can be reused in future. When the user 426 interacts with a widget, its state variable will be changed so as to cause a change in an appliance in a physical environment. If the state variable of the widget is updated, its appearance will be changed by applying the behavior to the widget. The system 400 may be a processor, a microcontroller, an application specific integrated circuit (ASIC), or other hardware platform.

FIGS. 5, 7, 8, 10, 11A and 11B are flowcharts of example processes. FIGS. 5, 7, 8, 10, 11A and 11B include a number of process blocks. Though arranged serially in the examples of FIGS. 5, 7, 8, 10, 11A and 11B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Figure 5:
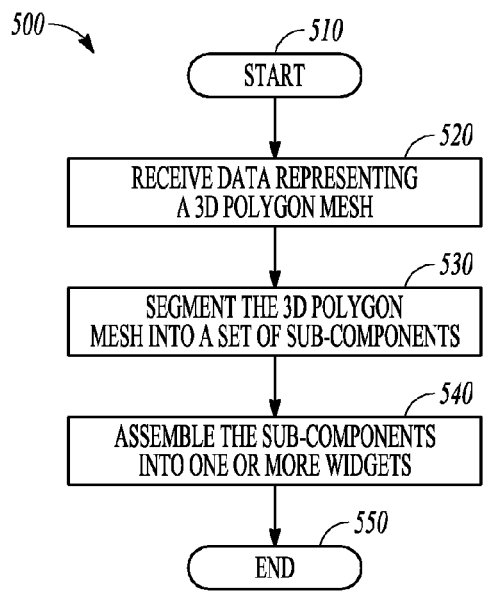
FIG. 5 is a flow diagram of a method 500 according to an example embodiment.
Figure 6A:
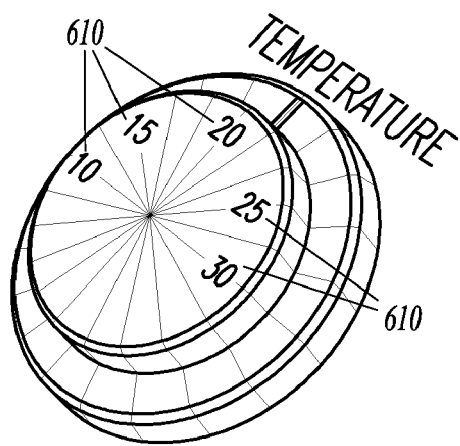
FIGS. 6A, 6B, 6C and 6D are block diagrams of the subcomponents according to an example embodiment.
Figure 6B:
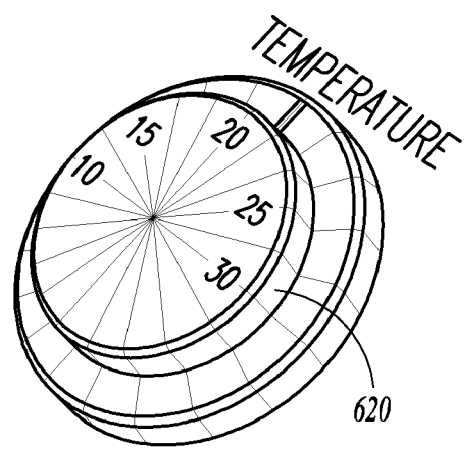
Figure 6C:
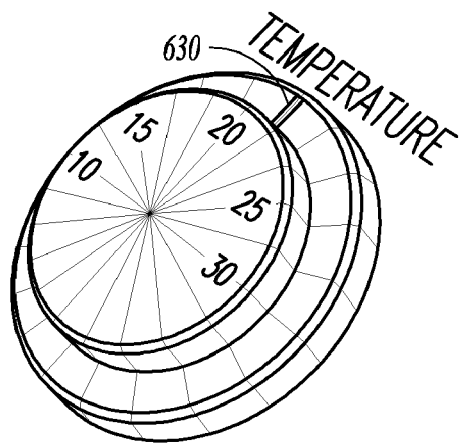
Figure 6D:
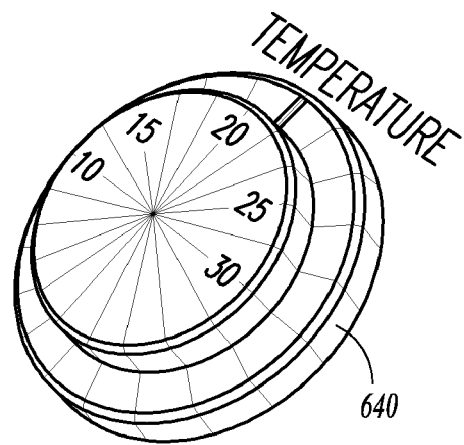

FIG. 5 is a flow diagram of a method 500 according to an example embodiment. The method 500 shows the activities of the mesh segmentation module 510. In block 510, the method 500 starts. In block 520, the mesh segmentation module 510 receives data representing the 3D polygon mesh 420. A static polygon mesh M is defined as a tuple {V, E, F} of vertices V={$p_i$|$p_i \in R^3$, $1 \leq i \leq m$}, edges E={($p_i$, $p_j$)|$p_i$, $p_j \in V$}, and faces F, which are usually triangles F={($p_i$, $p_j$, $p_k$)|$p_i$, $p_j$, $p_k \in V$}. The faces F can also include other types of planar polygons, such as a quadrangle, a pentagon, or a hexagon. In block 530, the 3D polygon mesh 420 is segmented into a set of sub-components. In particular, if S is a set of mesh elements that is either V, E or F, segmenting the 3D polygon mesh 145 means to partition S into k disjoint connected sets:

$$\bigcup_{i=1}^{k} S_i = S, S_i \subset S, S_i \cap S_j = \emptyset, i, j = 1 \ldots k, i \neq j$$

The 3D polygon mesh 420 may be segmented according to one of many segmentation algorithms such as, for example, a watershed-based mesh segmentation algorithm. The 3D polygon mesh 420 represents a rotatable temperature controller for an HVAC system. The mesh segmentation module 410 segments the 3D polygon mesh 420 into four sub-components, and FIGS. 6A, 6B, 6C and 6D are block diagrams of the sub-components according to an example embodiment. Numbers 610 representing temperature are included in a sub-component shown in FIG. 6A. A top cylinder 620 is a sub-component shown in FIG. 6B. A temperature indicator 630 is a sub-component shown in FIG. 6C, and a bottom cylinder 640 is a sub-component shown in FIG. 6D.

In block 540, the sub-components are assembled into one or more widgets. With reference to FIGS. 6A-6D, two kinds of widgets can be assembled to represent the rotatable temperature controller. The numbers 610 representing temperature and the top cylinder 620 are assembled as a widget with functionality to facilitate rotation of the top cylinder 620 by a user to adjust a temperature. The temperature indicator 630 and the bottom cylinder 640 are assembled as another, alternative widget with functionality to facilitate rotation of the bottom cylinder 640 by a user to adjust the temperature. In block 550, the method 500 ends.

Figure 7:
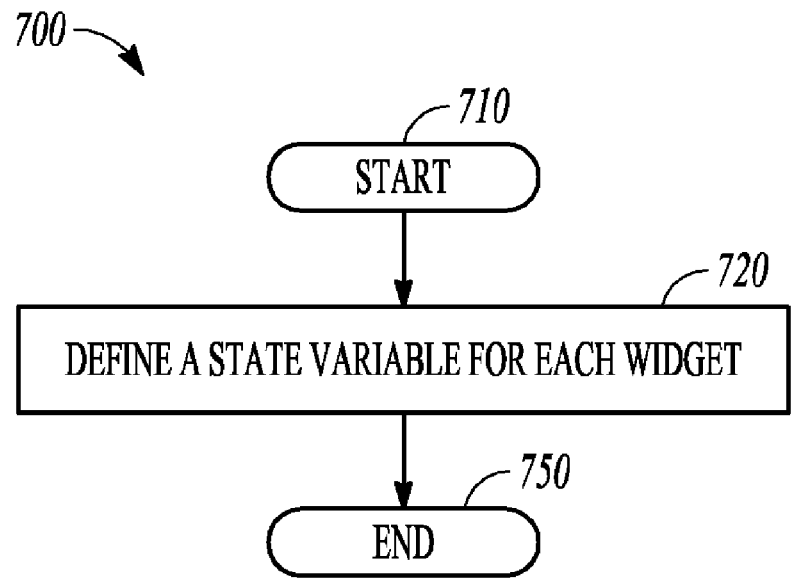
FIG. 7 is a flow diagram of a method 700 according to an example embodiment.

FIG. 7 is a flow diagram of a method 700 according to an example embodiment. The method 700 shows the activity of the state variable designation module 430. In block 710, the method 700 starts. In block 720, the state variable designation module 430 defines a state variable e for each widget:

$$e = \{<t,r>|t \in T, r \in R\}$$

The state variable e has a particular type $t \in T$ and a legal value range $r \in R$. Some examples of the type T include, but are not limited to, an integer, Boolean, and enumeration (T={int, bool, enum, . . . }). R={<k,R>|$k \in K$} is a set of possible legal value ranges, represented as a string list, where K is a set of strings. Different types of the state variable e parse the legal value range in different ways as shown in Table 1. If the type is "Int" and the legal range is [10, 30], the state variable e is an integer that is less than 30 and more than 10. If the type is "Bool" and the legal value range is [ON, OFF], the state variable e is "ON" when true and "OFF" when false. If the type is "Enum" and the legal value range is [Fast, Medium, Slow], the state variable e can be "Fast," "Medium," or "Slow".

TABLE 1

| Type | Range | Meaning |
| --- | --- | --- |
| Int | [10, 30] | $10 \leq e \leq 30$, e is a integer |
| Bool | [ON, OFF] | e = true means ON, e = false means OFF |
| Enum | [Fast, Medium, Slow] | e can be Fast, Medium, or Slow |

In block 750, the method 700 ends.

Figure 8:
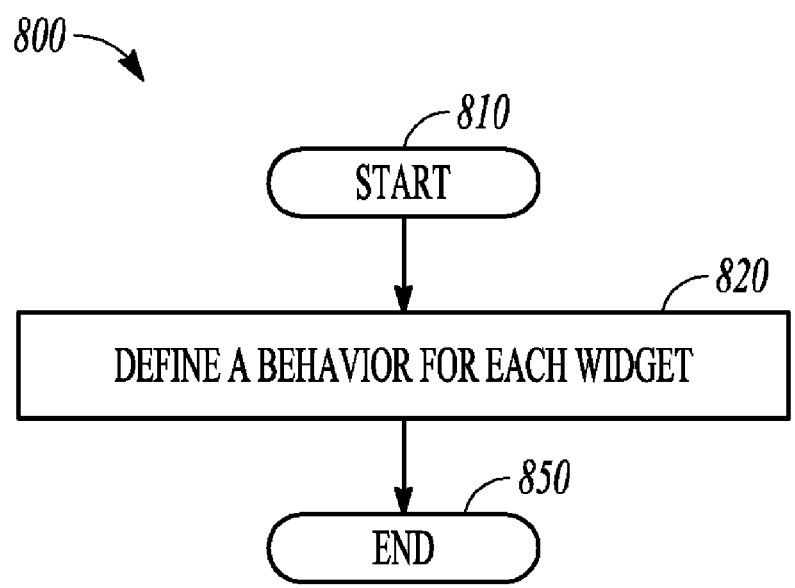
FIG. 8 is a flow diagram of a method 800 according to an example embodiment.

FIG. 8 is a flow diagram of a method 800 according to an example embodiment. The method 800 shows the activity of the behavior definition module 440. In block 810, the method 800 starts. In block 820, the behavior definition module 440 defines a behavior b for each widget:

$$b = \{<a,l>|a \in A, l \in L\}$$

The behavior b has a particular type $a \in A$ and a parameter list $l \in L$. The type A is rotation, translation, or other transformation (A={Rotation, Translation, . . . }) according to an example embodiment. L={<q,L>|$q \in R^3$} is a list of parameters, wherein $R^3$ is a three dimensional space, namely a Cartesian coordinate space that includes all points in the Cartesian coordinate space, and q is one point in the Cartesian coordinate space. A first parameter may be a point P, and a second parameter may be a nonzero normal vector $\vec{n}$ that is computed with respect to the point P. With P and $\vec{n}$, a plane is defined in the 3D polygon mesh 145 as a set of all points r such that $$\vec{n} \bullet (r - P) = 0$$

P is a point in 3D space and $\vec{n}$ is its normal vector. The above equation defines a 2D plane so that the behavior of a widget can be defined in 2D space instead of 3D space. That is, the behavior of a widget can be defined in the plane. Other parameters can be designated by a user.

Figure 9:
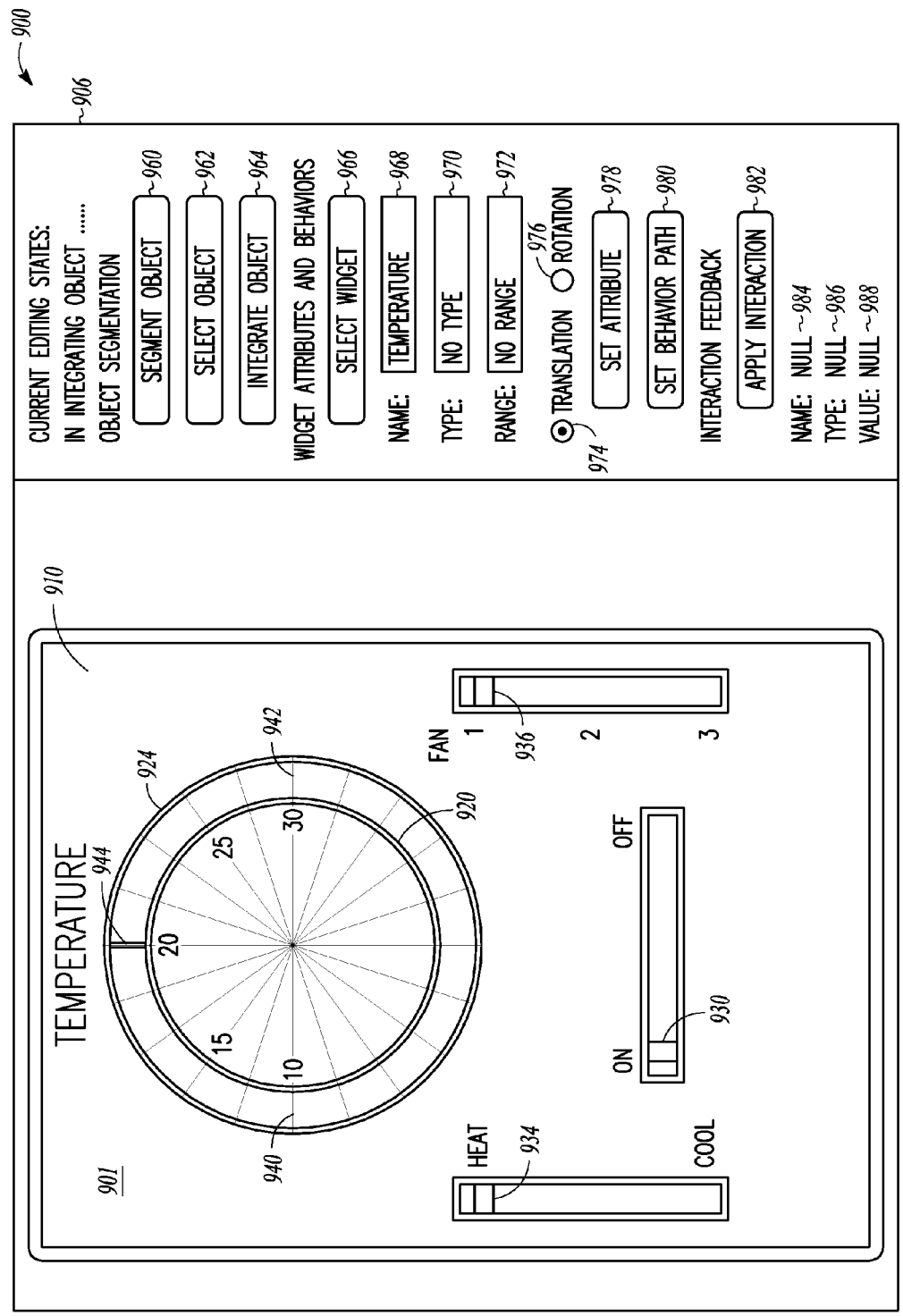
FIG. 9 is a diagram of a 3D UI image 900 according to an example embodiment.

FIG. 9 is a diagram of a 3D UI image 900 according to an example embodiment. The 3D UI image 900 is what a user would see from a display device when interacting with a 3D UI according to an example embodiment. The 3D UI image 900 includes the 3D polygon mesh 901 representing HVAC control and settings 906 that will be described herein. The 3D polygon mesh 901 may be segmented into six widgets including a base 910, a top cylinder 920, a bottom cylinder 924, a power control bar 930, a direction control switch 934 to switch between heating and cooling, and a fan control 936 to select a fan speed. The top cylinder 920 may include the numbers 910 representing temperature and the top cylinder 920 shown in FIGS. 6A and 6B according to an example embodiment. The behavior definition module 440 defines the behavior for the top cylinder 920 to be rotation (976) with respect to the base 910, and the behavior for the power control bar 930 to be translation (974) with respect to the base 910.

Behaviors defined for widgets may have constraints. Rotation in some embodiments may be constrained by a minimum angle point that cannot overrun an indicator point in a clockwise direction. Rotation may also be constrained by a maximum angle point that cannot overrun the indicator point in the counter-clockwise direction. In some embodiments, rotation has parameters including a center point, a normal vector computed from the center point, an indicator point, a minimum angle point, and a maximum angle point. Translation is permitted along a line segment between a start point and an end point. Translation may also have parameters including a start point, a normal vector, and an end point. Examples of numerical values for the parameters of translation and rotation are shown in Table 2.

TABLE 2

| Parameters: |
| --- |
| Type: Rotation |
| P: <45.3100, −13.5668, 65.2138> |
| N: <0.0000, −1.0000, 0.0000> |
| Indicator: <45.2720, −13.5668, 73.2607> |
| Angle1: <36.7368, −13.5668, 64.4327> |
| Angle2: <52.7542, −13.5668, 64.2552> |
| Type: Translation |
| P: <35.8292, −7.91529, 33.0807> |
| N: <0.0000, −1.0000, 0.0000> |
| P2: <56.3646, −7.91529, 33.1389> |

In Table 2, P is the center point of a temperature dial plate (power button—On), and N is its normal vector. P2 is the point for the power button (Off). Angle1, Angle2, and Indicator are three points for a minimum, maximum, and current temperature. The information from Table 2 can then be used to set the temperature setting point.

A dependency constraint may be attached to the widgets, which defines how the widgets interact with each other. In an HVAC controller according to an example embodiment, all other widgets such as the top cylinder 920 to control temperature, the direction control switch 934 to switch between heating and cooling, and the fan control 936 to select a fan speed, will be inactive when the power control bar 930 is set as OFF.

The 3D UI generated for the 3D polygon mesh 920 according to the methods 500, 700, and 800 allows a user to rotate the top cylinder 620 to set a temperature for a physical environment and to move the power control bar 930 to turn on or turn off power supplied to a physical object such as an appliance represented by the 3D polygon mesh 901.

In block 850, the method 800 ends.

Figure 10:
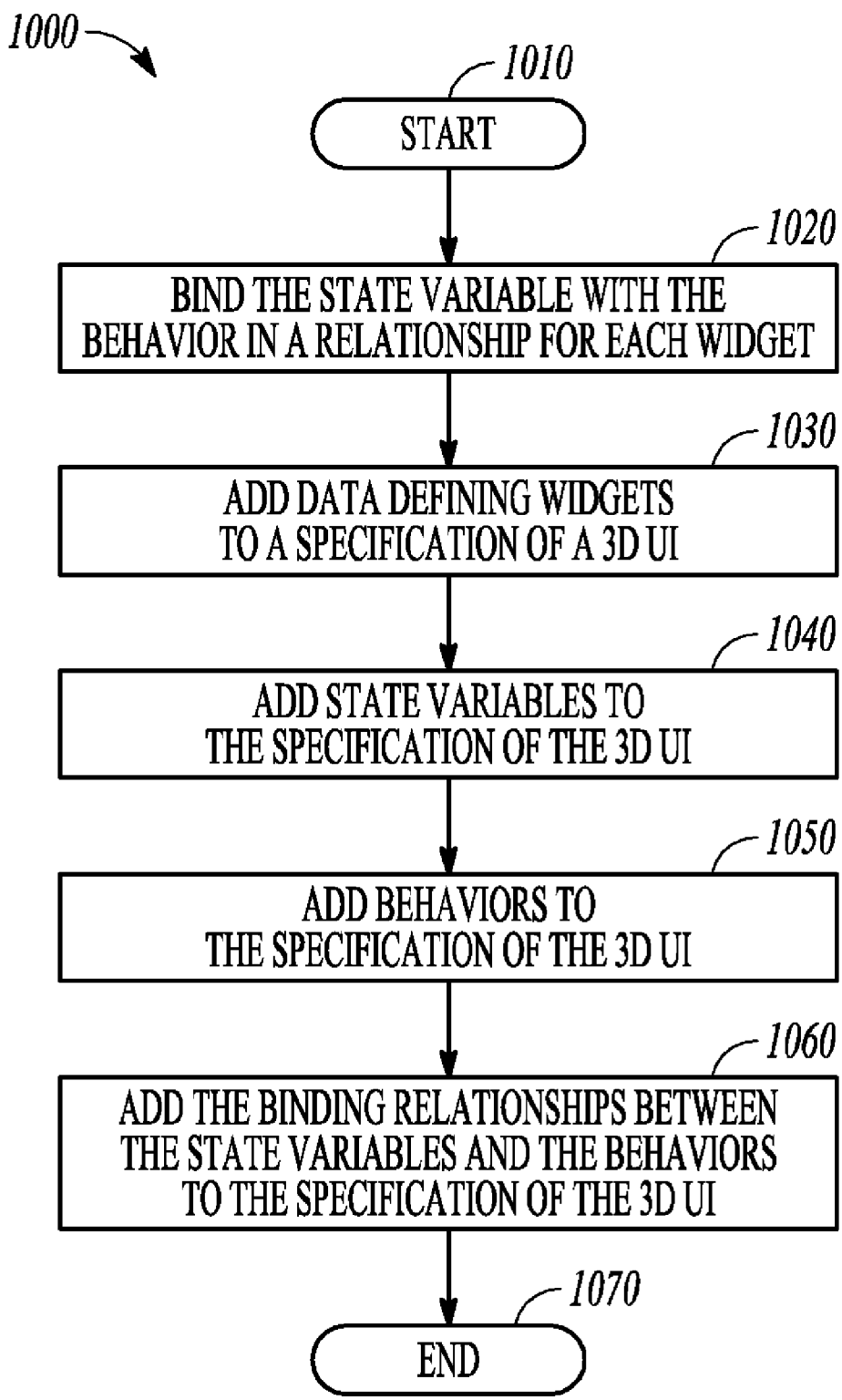
FIG. 10 is a flow diagram of a method 1000 according to an example embodiment.

FIG. 10 is a flow diagram of a method 1000 according to an example embodiment. The method 1000 shows the activity of the 3D UI specification module 450, and the method 1000 will be described with reference to the 3D UI image 906 shown in FIG. 9. In block 1010, the method 1000 starts. In block 1020, the 3D UI specification module 450 binds the state variable with the behavior in a relationship for each widget.

The activity of block 1020 may be illustrated with respect to the top cylinder 920 shown in FIG. 9. The top cylinder 920 has a defined behavior of rotation according to the method 700. The rotation is defined by several parameters including a center point, normal vector computed with respect to the center point, an indicator point, a minimum angle point, and a maximum angle point. The top cylinder 920 has a state variable e according to the method 800. The state variable e is an integer with a legal range of [10, 30]. The 3D UI specification module 450 defines the relationship by binding the minimum temperature 10 with a minimum angle point 940 and the maximum temperature 30 with a maximum angle point 942. With the definition of the state variable e, the behavior, and the binding relationship, the temperature at any rotation can be computed with linear interpolation. An indicator point widget 944 identifies a current temperature.

In blocks 630-660, the 3D UI specification module 450 assembles a specification of the 3D UI. The 3D UI specification can be stored as a file and loaded into a computing system to allow a user to visualize and interact with the 3D UI. In block 630, the 3D UI specification module 450 adds data defining the widgets generated by the mesh segmentation module 410 to the specification. In block 1040, the 3D UI specification module 450 adds the state variables defined by the state variable designation module 430 to the specification. In block 1050, the 3D UI specification module 450 adds the behaviors defined by the behavior definition module 440 to the specification. In block 1060, the 3D UI specification module 450 adds the binding relationships between the state variables and the behaviors defined by the 3D UI specification module 450 to the specification.

According to an example embodiment, a specification for the 3D UI is defined by a name and one or more widgets. Each widget is defined by a name, a state variable, a behavior, and a 3D shape. The 3D shapes are stored in the shape library 123, which can include color and texture data also. Each state variable is defined by a variable type, a valid value range, and a default value. Each behavior is defined by a behavior type and one or more parameters. Each 3D shape is defined by points and faces. According to an example embodiment, a specification for the 3D UI may include the following details:

3D UI=HVAC Controller, Widget1, Widget2, Widget3, Widget4

Widget1=Temperature

State Variable=(Int, [10, 30], 20)

Behavior=(Rotation, P: <45.3100, −13.5668, 65.2138>, N: <0.0000, −1.0000, 0.0000>, Indicator: <45.2720, −13.5668, 73.2607>, Angle1: <36.7368, −13.5668, 64.4327>, Angle2: <52.7542, −13.5668, 64.2552>)

3D Shape=(Points (0: 36.222, −13.568, 64.223), (1: 38.723, −13.568, 68.802), (2: 47.789, −13.568, 72.567), . . . ), (Faces (0: 0, 1, 2), (1: 2, 3, 5), (2: 3, 8, 9), . . . )

Widget2=Power

State Variable=(Bool, [ON, OFF], ON)

Behavior=(Translation, P: <35.8292, −7.91529, 33.0807>, N: <0.0000, −1.0000, 0.0000>, P2: <56.3646, −7.91529, 33.1389>

3D Shape=(Points (0: 55.734, −7.913, 32.235), (1: 57.212, −7.915, 32.239), (2: 56.239, −7.914, 34.967), . . . ), (Faces (0: 0, 2, 4), (1: 2, 3, 5), (2: 2, 8, 7), . . . )

The 3D shape for each widget includes many points and faces, and only three points and faces are shown here, and other points and faces are represented with suspension points. The details of Widget3 for a heat controller and Widget4 for a fan controller are also not shown.

In block 1070, the method 1000 ends.

The steps in the methods 500, 700, 800, and 1000 may be implemented by hardware in an ASIC or may take the form of instructions implemented by a computing device such as a microprocessor or a microcontroller.

With reference to FIG. 9, the controls 906 in the 3D UI image 900 allow a user to implement the acts in the methods 500, 700, 800, and 1000 described above. A segmentation control 960 allows a user to segment the 3D polygon mesh 420 into sub-components. A first select control 962 allows the user to select one or more of the sub-components to be included in a widget. An integration control 964 allows the user to assemble the selected sub-components into a widget. Once all of the widgets are assembled, a second select control 966 allows the user to select one of the widgets. A first name entry 968 allows the user to assign a name for a state variable for the selected widget. A first type entry 970 allows the user to assign a type to the state variable. A range entry 972 allows the user to assign a range for the state variable. A translation entry 974 allows the user to indicate translation as the behavior for the selected widget. A rotation entry 976 allows the user to indicate rotation as the behavior for the selected widget. Other transformations could also be indicated. An attribute control 978 allows the user to indicate an attribute for the selected widget. A behavior path control 980 allows the user to indicate a behavior path for the selected widget. An interaction control 982 allows the user to define a relationship between the state variable and the behavior for the selected widget. A second name entry 984 allows the user to assign a name for a state variable for the selected widget. A second type entry 986 allows the user to assign a type to the state variable. A value entry 988 allows the user to assign a range for the state variable.

The 3D UI described herein according to example embodiments are operated by the user to create an animated control for an appliance or application in a physical environment such as an HVAC control subsystem. When an operation is applied to a widget in the 3D UI, the state variable of the widget is updated, and an action on the appliance in the physical environment is activated via a communication protocol. When an action is applied to the appliance in the physical environment, a corresponding state variable of the 3D UI is updated via the communication protocol, and an operation on the corresponding widget is presented in the 3D UI. In such an implementation, the three dimensional representation of such appliances can be directly linked to data produced by a real-time control system. Also, the three dimensional representation of the appliances can be responsive and adaptive to data provided by the real-time control system or a data source separate from the real-time control system.

With reference to FIG. 9, a user interacting with the 3D UI image 900 may turn the top cylinder 920 to initiate a movement in a HVAC controller in a physical environment via a communication protocol. Such a movement of the HVAC controller may lead to a change in temperature in the physical environment. Likewise, a temperature adjustment action applied to the HVAC controller in the physical environment is presented through the communication protocol as a rotation of the top cylinder 920 in the 3D UI image 900.

The example embodiments described herein begin with a high fidelity geometric model, such as the 3D polygon mesh 420, designed by graphic designers or scanned from a picture of the physical object. The example embodiments generate a 3D UI from the geometric model which can be animated for user operation in a user friendly 3D visual environment.

Figure 11A:
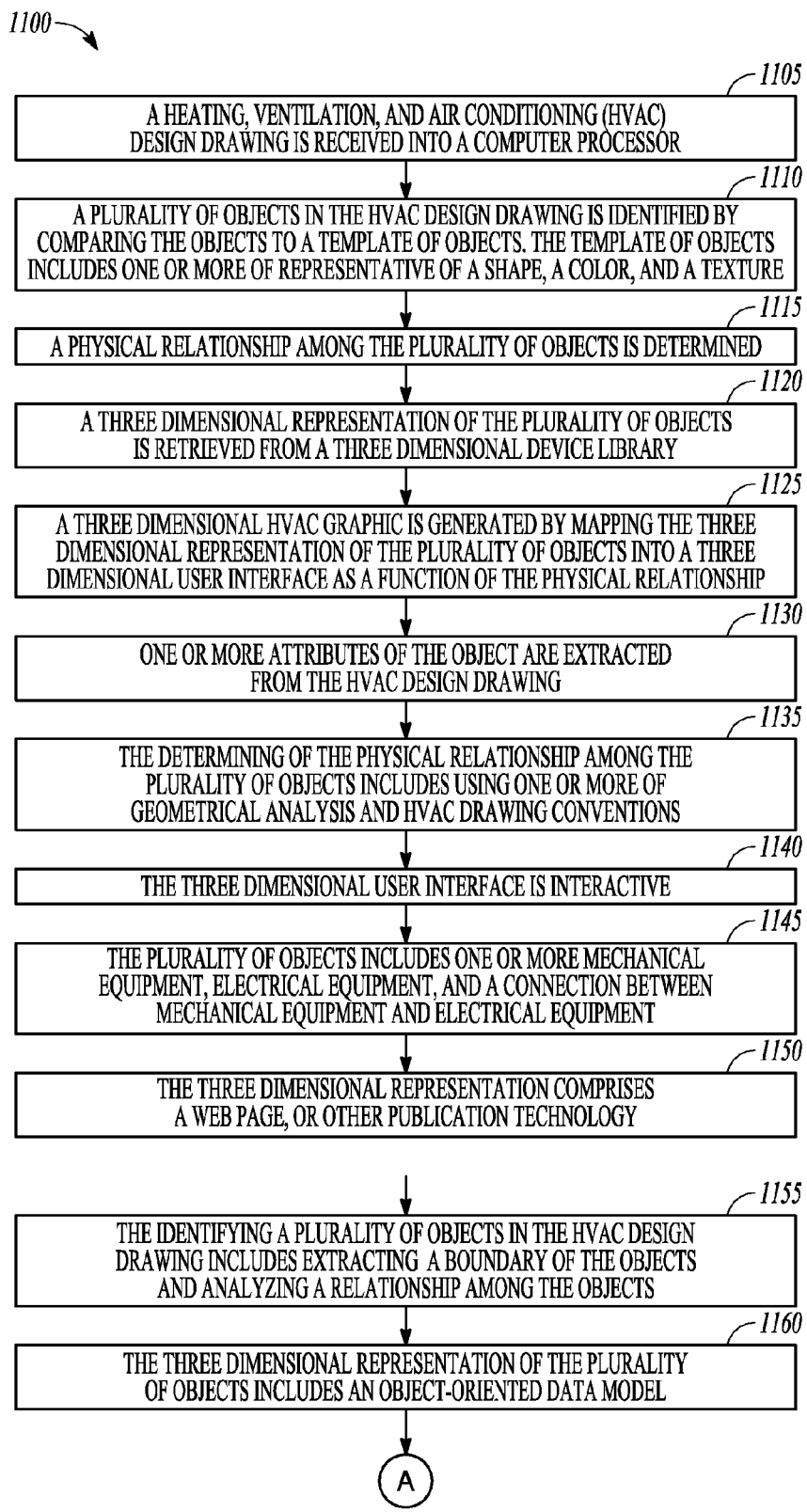
FIGS. 11A and 11B are a flowchart of an example process 1100 of constructing a three dimensional representation from an HVAC drawing.
Figure 11B:
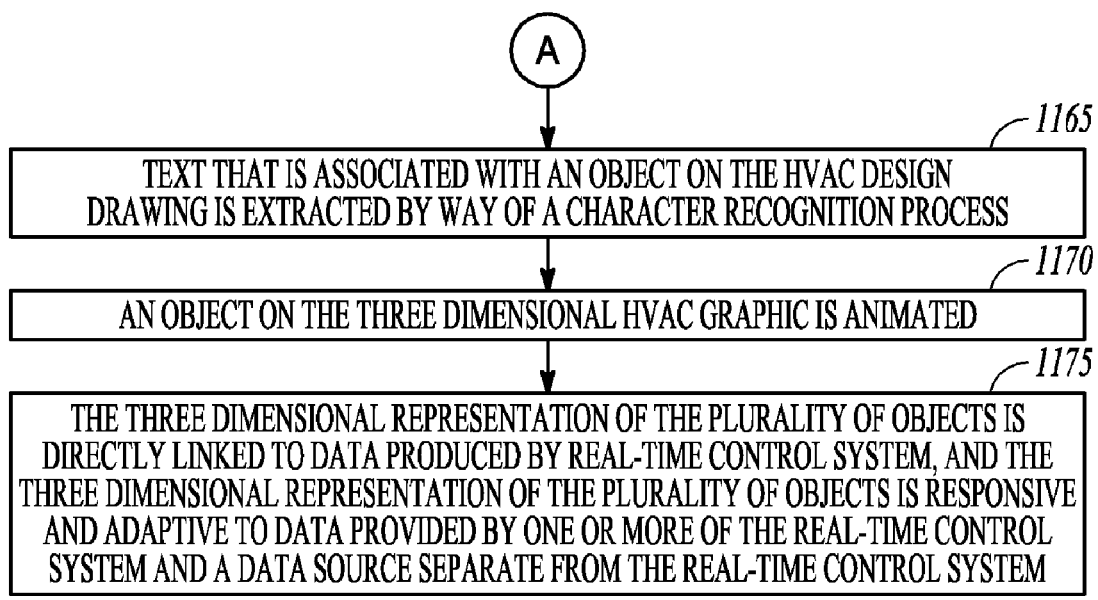

FIGS. 11A and 11B are a flow chart of an example process 1100 to construct an HVAC graphic from an HVAC design drawing. At 1105, a heating, ventilation, and air conditioning (HVAC) design drawing is received into a computer processor. At 1110, a plurality of objects in the HVAC design drawing is identified by comparing the objects to a template of objects. The template of objects includes one or more of a shape, a color, and a texture. At 1115, a physical relationship among the plurality of objects is determined. At 1120, a three dimensional representation of the plurality of objects is retrieved from a three dimensional device library. At 1125, a three dimensional HVAC graphic is generated by mapping the three dimensional representation of the plurality of objects into a three dimensional user interface as a function of the physical relationship.

At 1130, one or more attributes of the object are extracted from the HVAC design drawing. At 1135, the determining of the physical relationship among the plurality of objects includes using one or more of geometrical analysis and HVAC drawing conventions. At 1140, the three dimensional user interface is interactive. At 1145, the plurality of objects includes one or more of mechanical equipment, electrical equipment, and connections between mechanical equipment and electrical equipment. At 1150, the three dimensional representation comprises a web page, a script, or other publication technology. At 1155, the identifying a plurality of objects in the HVAC design drawing includes extracting a boundary of the objects and analyzing a relationship among the objects. At 1160, the three dimensional representation of the plurality of objects includes an object-oriented data model. At 1165, text that is associated with an object on the HVAC design drawing is extracted by way of a character recognition process. At 1170, an object on the three dimensional HVAC graphic is animated. At 1175, the three dimensional representation of the plurality of objects is directly linked to data produced by a real-time control system, and the three dimensional representation of the plurality of objects is responsive and adaptive to data provided by one or more of the real-time control system and a data source separate from the real-time control system.

Figure 12:
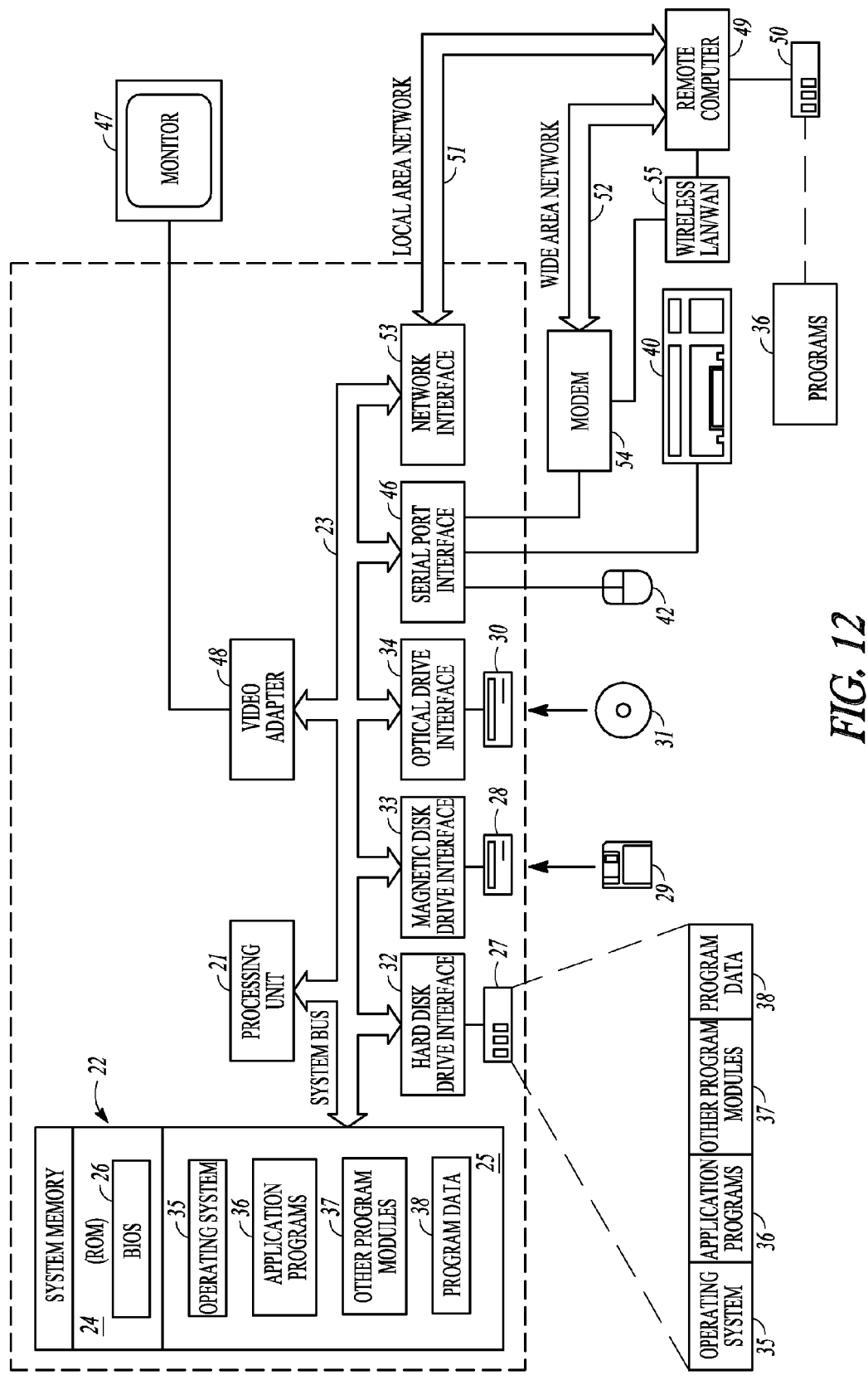
FIG. 12 is a block diagram of an example embodiment of a computer system upon which one or more embodiments of the present disclosure can execute.

FIG. 12 is an overview diagram of a hardware and operating environment in conjunction with which embodiments of the invention may be practiced. The description of FIG. 12 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 12, a hardware and operating environment is provided that is applicable to any of the servers and/or remote clients shown in the other Figures.

As shown in FIG. 12, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 12 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown 51, 52, and 55 are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for generating a building control subsystem graphic from a building control subsystem design drawing have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the art disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The invention claimed is:

1. A computerized method comprising:
    receiving into a computer processor a two dimensional building control subsystem design drawing;
    identifying with the computer processor a plurality of objects in the building control subsystem design drawing by comparing the objects to a template of objects, the template of objects comprising one or more of a representation of a shape, a color, and a texture;
    determining with the computer processor a physical relationship among the plurality of objects;
    retrieving into the computer processor a three dimensional representation of the plurality of objects from a three dimensional device library; and
    generating with the computer processor a three dimensional building control subsystem graphic by mapping the three dimensional representation of the plurality of objects into a three dimensional user interface as a function of the physical relationship.

2. The computerized method of claim 1, comprising extracting one or more attributes of the object from the building control subsystem design drawing.

3. The computerized method of claim 1, wherein determining the physical relationship among the plurality of objects comprises using one or more of geometrical analysis and building control subsystem drawing conventions.

4. The computerized method of claim 1, wherein the three dimensional user interface is interactive.

5. The computerized method of claim 1, wherein the plurality of objects comprise one or more of mechanical equipment, electrical equipment, and a connection between mechanical equipment and electrical equipment.

6. The computerized method of claim 1, wherein the three dimensional representation comprises one or more of a web page, a script, or other publication technology.

7. The computerized method of claim 1, wherein the identifying a plurality of objects in the building control subsystem design drawing comprises extracting a boundary of the objects and analyzing a relationship among the objects.

8. The computerized method of claim 1, wherein the three dimensional representation of the plurality of objects comprises an object-oriented data model.

9. The computerized method of claim 1, comprising extracting text associated with an object on the building control subsystem design drawing by way of a character recognition process.

10. The computerized method of claim 1, comprising animating an object on the three dimensional building control subsystem graphic.

11. The computerized method of claim 1, wherein the three dimensional representation of the plurality of objects is directly linked to data produced by a real-time control system, and wherein the three dimensional representation of the plurality of objects is responsive and adaptive to data provided by one or more of the real-time control system and a data source separate from the real-time control system.

12. A non-tangible computer readable medium comprising instructions that when executed by a computer processor execute a process comprising:
    receiving a building control subsystem design drawing;
    identifying a plurality of objects in the building control subsystem design drawing by comparing the objects to a template of objects, the template of objects comprising one or more of a representation of a shape, a color, and a texture;
    determining a physical relationship among the plurality of objects;
    retrieving a three dimensional representation of the plurality of objects from a three dimensional device library; and
    generating a three dimensional building control subsystem graphic by mapping the three dimensional representation of the plurality of objects into a three dimensional user interface as a function of the physical relationship.

13. The non-tangible computer readable medium of claim 12, comprising instructions for extracting one or more attributes of the object from the building control subsystem design drawing.

14. The non-tangible computer readable medium of claim 12, wherein determining the physical relationship among the plurality of objects comprises using one or more of geometrical analysis and building control subsystem drawing conventions.

15. The non-tang computer readable medium of claim 12, wherein the plurality of objects comprise one or more of mechanical equipment, electrical equipment, and a connection between the mechanical equipment and the electrical equipment.

16. The non-tangible computer readable medium of claim 12, wherein the identifying a plurality of objects in the building control subsystem design drawing comprises extracting a boundary of the objects and analyzing a relationship among the objects.

17. The non-tangible computer readable medium of claim 12, wherein the three dimensional representation of the plurality of objects comprises an object-oriented data model.

18. The non-tangible computer readable medium of claim 12, comprising instructions for extracting text associated with an object on the building control subsystem design drawing by way of a character recognition process.

19. The non-tangible computer readable medium of claim 12, comprising instructions for animating an object on the three dimensional building control subsystem graphic.

20. The non-tangible computer readable medium of claim 12, wherein the three dimensional representation of the plurality of objects is directly linked to data produced by a real-time control system, and wherein the three dimensional representation of the plurality of objects is responsive and adaptive to data provided by one or more of the real-time control system and a data source separate from the real-time control system.

* * * * *